Patented June 17, 1952

2,600,813

UNITED STATES PATENT OFFICE 2,600,813

PRODUCTION OF PHOSPHORIC ACID

Calvin M. Tidwell, Middleport, N. Y., assignor to International Minerals & Chemical Corporation, a corporation of New York No Drawing. Application November 29, 1948, Serial No. 62,599

8 Claims. (Cl. 23—165)

This invention relates to a process for the production of phosphoric acid. More particularly the invention relates to a process for the production of phosphoric acid which is substantially free from iron compounds and certain other impurities.

In a narrow sense, the term ferrophosphorus is definitive of a rather complex mixture of compounds of iron and phosphorus and is understood to be a mixture of alloys of iron and phosphorus. This type of ferrophosphorus may be produced by fluxing appropriate amounts of metallic iron and elemental phosphorus until the metals react to form an alloy having the requisite proportions of the elements. Depending upon the molecular proportions of iron and phosphorus employed in the reaction, an alloy is obtained which contains an extensive series of compounds of iron and phosphorus. For example, among the compounds of iron and phosphorus which are present in a typical ferrophosphorus product may be mentioned the following: $Fe_3P$, $Fe_5P_2$, $Fe_4P_3$, $Fe_2P$, $FeP$ and $Fe_3P_4$. This type of ferrophosphorus is generally produced for certain uses in the steel industry wherein controlled amounts of phosphorus must be added to alloy steel products in order to control the oxygen content thereof.

More liberally construed, the term ferrophosphorus is definitive of a rather impure product which is produced in electrolytic furnaces wherein a mixture of phosphatic material such as tricalcium phosphate, silica and carbon or coke is heated in an electric arc in order to produce elemental phosphorus by a volatilization procedure. Periodically such furnaces are tapped in order to draw off molten slag or other impurities from the reaction mixture. A certain portion of this slag contains ferrophosphorus, including substantially all of the compounds of iron and phosphorus mentioned above, as well as certain compounds of calcium such as calcium silicate. This slag is known in the trade as ferrophosphorus, and the term ferrophosphorus as employed herein and in the appended claims is deemed to include such an impure product as well as the products of higher purity described in the preceding paragraph.

It has been previously proposed to employ ferrophosphorus in a more or less pure state for the production of phosphoric acid by reacting ferrophosphorus with concentrated sulfuric acid. For example as was taught in the article "The decomposition of ferrophosphorus" by F. A. Henglein and K. Stoeckert, Beiheft Z. Ver. duet. Chem. No. 27 or Angew. Chem. 50, 380–2 (1937), ferrophosphorus has been heated at temperatures above 100° C. with concentrated sulfuric acid or sulfuric acid monohydrate in a ratio of about 1 part by weight of ferrophosphorus to about 4 to 5 parts by weight of concentrated sulfuric acid. The resulting reaction product comprises phosphoric acid, ferrous sulfate, hydrogen sulfide, sulfur, sulfur dioxide and water. The resultant reaction mixture is clarified by either filtration or centrifugation, thereby removing the suspended solids contained therein which comprise ferrous sulfate and sulfur produced during the reaction. The resultant acid mixture comprises a mixture of meta-phosphoric acid, orthophosphoric acid and sulfuric acid. While it has been stated that this acid mixture is substantially free from iron compounds such as ferrous sulfate, it has been found that the final acid mixture contains between about ½ and about 1 part by weight of ferric oxide to 100 parts by weight of phosphorus pentoxide. This relatively high iron content relegates the product to the class of impure phosphoric acids, and in order to remove the residual iron therefrom, the acid mixture must be subjected to a series of chemical treatments such as addition thereto of hydrogen sulfide or metallic sulfides in order to eliminate the iron as iron sulfide. It has been found that such a procedure is economically prohibitive and the resulting purified phosphoric acid is not competitive with pure phosphoric acid produced by the oxidation of elemental phosphorus.

It is an object of the invention to produce phosphoric acid from ferrophosphorus, said acid being substantially free of iron compounds.

It is a further object of the invention to produce phosphoric acid from ferrophosphorus, said acid being substantially free from sulfur and compounds of sulfur.

It is a further object of the invention to produce phosphoric acid from ferrophosphorus, said acid being of sufficient purity to render it acceptable to the pharmaceutical and food industries.

The above objects, as well as others which will become apparent upon a more complete understanding of the invention which is hereinafter fully described, are accomplished by reacting a composition containing ferrophosphorus with sulfuric acid while maintaining the reaction mixture in an anhydrous condition. The ferrophosphorus employed in the reaction may be a pure alloy of iron and phosphorus or one containing compounds of iron and phosphorus of the type previously herein described. Alternatively, it may be a rather impure ferrophosphorus such as that produced in slag in phosphorus electric furnaces, and which has a typical analysis as follows:

| | |
|---|---|
| 21.5% P | 1.3% Ti |
| 3.6% Si | 0.5% C |
| 3.3% Mn | 0.08% F |
| 67.2% Fe | Trace CaO |

Either type of product may be reacted with sulfuric acid at a suitable temperature while maintaining the reaction mixture in an anhydrous condition. This is accomplished by incorporating in the sulfuric acid a suitable dehydrating agent which is inert with respect to the sulfuric acid and ferrophosphorus under the conditions obtaining, in an amount sufficient to remove from the reaction mixture the water which is produced in the reaction between ferrophosphorus and the sulfuric acid. Usually a substantial amount of sulfur will be formed during the reaction between ferrophosphorus and sulfuric acid, and will precipitate from the reaction mixture together with other insoluble matter such as ferrous sulfate, usually in a finely divided state. Since the precipitated solids are subsequently removed from the acid solution either by filtration or centrifugation, the formation of finely divided material is rather objectionable in that such filtration operations are quite difficult to perform due to clogging of the filtration media. The precipitation of sulfur during the reaction may be avoided by preliminarily incorporating into the reaction mixture a suitable oxidizing agent which will oxidize the sulfur to sulfur dioxide, the latter being eliminated from the reaction mixture as a gas during the reaction period.

It has been found that when a ferrophosphorus-sulfuric acid mixture is maintained in a substantially anhydrous condition during the reaction period, the ferrous sulfate which is produced during the reaction is substantially insoluble in the resultant reaction mixture and that the phosphoric acid which is the end product of the process contains only about 1 part by weight of ferric oxide to about 2,000 parts by weight of phosphorus pentoxide in contrast to the 1% of ferric oxide in phosphoric acid which has been produced from ferrophosphorus in accordance with the prior procedure hereinbefore described. Ferrophosphorus and sulfuric acid which contains a dehydrating agent, and preferably in addition thereto, an oxidizing agent in amounts which will be hereinafter described, will react at temperatures of about 100° C. and higher, preferably at a temperature of about 250° C. The water which is normally produced in the reaction between ferrophosphorus and sulfuric acid will be removed from the reaction mixture by the dehydrating agent present therein. Ferrous sulfate, which is produced in the reaction, readily precipitates from the reaction mixture and may be removed by the procedures previously herein described. When an appropriate oxidizing agent of the type herein subsequently described is present in the sulfuric acid, the sulfur which is produced during the reaction is removed from the reaction mixture as gaseous sulfur dioxide. In the event that a ferrophosphorus slag is employed in the reaction with sulfuric acid, an additional amount of precipitate will be formed which comprises calcium sulfate, calcium silicate and small amounts of aluminum and other metallic sulfates. These will also be removed with precipitated ferrous sulfate by the procedures previously herein described. The resulting clarified acid mixture comprises essentially meta-phosphoric acid and varying amounts of sulfuric acid, the latter depending upon the quantity of sulfuric acid originally employed in the reaction. The resulting clarified acid solution is heated in order to remove therefrom the varying amounts of sulfuric acid present therein. For this operation temperatures between about 400° and about 500° C. are sufficient to remove substantially all of the excess sulfuric acid from the acid mixture when performing the heating operation at atmospheric pressure. This results in a product containing less than 1% by weight of sulfuric acid, said product being meta-phosphoric acid of about 98 to 99% purity. This product may be converted into pyro- or orthophosphoric acid by the addition thereto of suitable amounts of water in accordance with methods which are familiar to those skilled in the art.

More particularly the instant process is carried out by admixing ferrophosphorus of the type previously herein described with an appropriate amount of sulfuric acid, the latter containing dehydrating agent for the purpose of removing the water, and preferably in addition thereto an oxidizing agent for removing sulfur produced during the reaction. While it is possible to employ equivalent amounts of sulfuric acid in order to react with the phosphorus values contained in the ferrophosphorus, it is preferable to employ an excess of sulfuric acid in order to produce a fluid reaction mixture, and in order to produce a reaction product which is more amenable to filtration or centrifugation procedures. Preferably between about 10 and about 20 parts of sulfuric acid which contains dehydrating agent to 1 part by weight of ferrophosphorus are employed in order to produce a workable reaction mixture. The amount of dehydrating agent present in the reaction mixture should be such that all of the water produced therein is automatically removed from the liquid phase as it is produced during the reaction. Any dehydrating agent which is inert with respect to the reactants under the conditions obtaining and whose hydrate may be removed from the reaction product may be employed. Among those which are particularly suitable may be mentioned sulfur trioxide, phosphorus pentoxide, and other dehydrating agents which, upon reaction with water, will produce a product which may be volatilized in subsequent steps of the process. In the event that minor amounts of impurities other than iron and aluminum may be present in the final phosphoric acid product, it is possible to employ such dehydrating agents as anhydrous sodium sulfate, potassium sulfate, magnesium sulfate, and similar dehydrating agents. The only limitation upon the dehydrating agent is that it must hydrate in preference to having the ferrous sulfate become hydrated. The latter must remain unhydrated if it is to be successfully removed from the resulting reaction mixture. As herein previously described, it is usually advantageous to incorporate in the reaction mixture an oxidizing agent which is inert with respect to the reactants under the conditions obtaining and which will oxidize the sulfur produced during the reaction to sulfur dioxide. Sulfur trioxide is a particularly suitable reagent for this purpose. Oxidizing agents such as sodium peroxide, barium peroxide, nitric acid, hydrogen peroxide, potassium dichromate and sodium dichromate, oxygen, chlorine and fluorine may also be employed in order to oxidize the sulfur.

It has been found that sulfur trioxide is particularly applicable both as a dehydrating agent and as an oxidizing agent in the instant process. Therefore, in a preferred embodiment of the invention ferrophosphorus is heated with an excess of sulfuric acid which contains sulfur trioxide, such a reagent being known in the trade as oleum. For example, ferrophosphorus can be heated at a temperature above about 100° C., and preferably between about 100° C. and about 300° C. with an excess of oleum, the latter containing between about 10 and about 25% by weight of sulfur trioxide. By the terms "excess of oleum" or "excess of sulfuric acid" is meant an amount of either oleum or sulfuric acid which is in excess of the stoichiometric amount required to react with the phosphorus values contained in the ferrophosphorus. Preferably about 1 part by weight of ferrophosphorus is reacted with between about 10 and about 20 parts by weight of oleum, or sulfuric acid which contains a suitable amount of dehydrating agent, and preferably, in addition thereto, contains oxidizing agent of the type herein previously described. The reaction between ferrophosphorus and sulfuric acid or oleum takes place beginning at about 100° C. and is preferably conducted between about 100° and about 300° C. The period of time required for the reaction will depend upon various factors such as the temperature at which the reaction is carried out; the excess of oleum or sulfuric acid containing dehydrating agent; and upon the amount of dehydrating agent and oxidizing agent present in the reaction mixture. The impurities which precipitate from the resultant reaction mixture comprise ferrous sulfate and small quantities of other metallic sulfates including calcium and aluminum in the event that an impure ferrophosphorus has been employed in the reaction. The precipitated impurities are removed from the reaction mixture by a filtration or centrifugation procedure which is carried out in an anhydrous atmosphere, for example, dry air, nitrogen or carbon dioxide. The temperature of filtration or centrifugation is not critical but due to the inherent viscosity of the reaction product, these operations are preferably conducted while maintaining the reaction mixture at a temperature between about 50° and about 100° C. In order to increase the yield of reaction product it is preferable to wash the insoluble precipitate with either oleum, anhydrous sulfuric acid, or sulfuric acid containing a suitable dehydrating agent. The resulting acid mixture is then heated in order to volatilize excess sulfuric acid and excess volatile dehydrating and oxidizing agent present therein. This operation may be conducted at atmospheric pressure at temperatures up to 500° C., preferably between about 400° and 500° C. This achieves volatilization of substantially all excess sulfuric acid. Evaporation may also be conducted in vacuo at correspondingly lower temperatures. In some instances it is advantageous to evaporate the acid mixture to a point where the sulfuric acid content of the same has been reduced to about 15 to 25% sulfuric acid. The mixture is allowed to stand for a suitable period of time, whereupon a small additional amount of solids, which comprise ferrous sulfate and minor amounts of other metallic sulfates, precipitate from the acid mixture. The evaporation is then continued until substantially all the sulfuric acid has been volatilized from the acid product. The resulting meta-phosphoric acid may then be converted into ortho-phosphoric acid by the addition thereto of a suitable amount of water. The resulting product has an iron oxide content of about 1 part by weight of $Fe_2O_3$ to about 2,000 parts by weight of $P_2O_5$ and exhibits a negative sulfur trioxide analysis.

The insoluble precipitate which is removed from the reaction product according to procedures herein previously described, consists principally of ferrous sulfate and may be decomposed by heating at elevated temperatures into ferric oxide and sulfur trioxide. The sulfur trioxide may be added to sulfuric acid to produce oleum, which is one of the preferable reactants in the instant process. The iron oxide may be reacted with tricalcium phosphate from phosphatic rock or other suitable phosphatic material to form ferrophosphorus. This affords a cyclic process which conserves the reactants and substantially reduces the overall cost of the process.

In the event that the phosphoric acid produced by reacting ferrophosphorus with oleum, or sulfuric acid containing a suitable dehydrating agent and oxidizing agent, contains a small amount of color bodies due to certain organic impurities contained in the ferrophosphorus or sulfuric acid, this may be removed by adding to the phosphoric acid product a suitable amount of oxidizing agent such as nitric acid, hydrogen peroxide, chlorine gas and similar reagents which are customarily used for purification by oxidation.

In order to more fully illustrate the nature and character of the invention, but with no intention of being limited thereby, the following example is recited:

*Example*

About 25 g. of ferrophosphorus which is produced as a slag in an electrolytic phosphorus furnace and which contains a phosphorus equivalent of about 13.31 g. of $P_2O_5$, was mixed with about 350 g. of 20% oleum (sulfuric acid monohydrate containing about 20% by weight of sulfur trioxide). The resulting mixture was heated for about 1 hour at a temperature of about of about 300° C. The resulting reaction product was then filtered under pressure of dry nitrogen gas and the filter cake washed with 20% oleum in an amount equivalent to about ½ of the volume of the original filtrate. The combined filtrates were evaporated directly at atmospheric pressure by heating the acid mixture to a temperature of about 450° C. The resulting metaphosphoric acid distiland was hydrolyzed to a dilute ortho-phosphoric acid by adding about 124 g. of water thereto. The resulting ortho-phosphoric acid had an iron content of about 1 part by weight of $Fe_2O_3$ to about 2,000 parts by weight of $P_2O_5$. The filter cake contained about 0.89 g. of $P_2O_5$ of which about 11.2% or 0.1003 g. was unreacted ferrophosphorus. The yield of ortho-phosphoric acid based upon the phosphorus content of the original ferrophosphorus was about 93% by weight.

It is apparent from the analysis of the phosphoric acid produced in accordance with the above described process that a substantial reduction in the iron content of phosphoric acid produced from ferrophosphorus in a reaction with sulfuric acid has been achieved in comparison with the procedures heretofore employed. Furthermore, a phosphoric acid is produced which is about 98 to 99% pure, and which contains no measurable $SO_3$ content.

While the instant process as herein described has illustrated a batch type operation, it is not intended to limit the invention to such an operation. On the contrary, a continuous type operation may be advantageously employed by recycling sulfur trioxide and ferric oxide, the latter being produced by decomposing ferrous sulfate, which precipitates during the reaction, into ferric oxide and sulfur trioxide, and reacting the ferric oxide with phosphatic matter to produce ferrophosphorus as previously herein described. If desired, sulfur trioxide may be introduced directly into the reacting mixture while using sulfuric acid as one of the reactants. Furthermore, it is not intended to limit the invention to the particular operational details herein set forth, but obvious extensions and modifications which will be familiar to those skilled in the art are deemed to be within the scope of the invention.

Having thus fully described the nature and character of the invention, what is desired to be secured by Letters Patent is:

1. A process for producing substantially iron-free phosphoric acid which comprises reacting at above about 100° C. a composition containing essentially ferrophosphorus with sulfuric acid which contains free sulfur trioxide in an amount sufficient to remove from the reaction mixture the water produced therein and separating the precipitated solids from the resultant reaction mixture and removing excess sulfuric acid and sulfur trioxide from the resultant acid mixture.

2. A process for producing substantially iron-free phosphoric acid which comprises reacting at above about 100° C. a composition containing essentially ferrophosphorus with substantially anhydrous sulfuric acid which contains dehydrating agent inert with respect thereto in an amount sufficient to remove from the reaction mixture the water produced therein and having greater affinity for water than ferrous sulfate, said sulfuric acid also containing oxidizing agent in an amount sufficient to oxidize the free sulfur produced in the reaction and separating the precipitated solids from the resultant reaction mixture and removing excess sulfuric acid from the resultant acid mixture.

3. A process for producing substantially iron-free phosphoric acid which comprises reacting at above about 100° C. a composition containing essentially ferrophosphorus with substantially anhydrous sulfuric acid which contains dehydrating-oxidizing agent inert with respect thereto in an amount sufficient to remove from the reaction mixture the water produced therein and to oxidize the sulfur produced in the reaction and separating the precipitated solids from the resultant reaction mixture and removing excess sulfuric acid from the resultant acid mixture.

4. A process for producing substantially iron-free phosphoric acid which comprises heating a composition comprising essentially ferrophosphorus with 10 to 20 parts of oleum per part of ferrophosphorus at a temperature above about 100° C. separating precipitated solids from the resultant reaction mixture and removing excess sulfuric acid from the resultant acid mixture.

5. A process for producing substantially iron-free phosphoric acid which comprises heating a composition containing essentially ferrophosphorus with an amount of sulfuric acid in the range of 10 to 20 parts of acid per part of ferrophosphorus, which contains between about 10 and about 25% by weight of free sulfur trioxide, at a temperature above about 120° C. separating precipitated solids from the resultant reaction mixture and removing excess sulfuric acid and sulfur trioxide from the resultant acid mixture.

6. A process for producing substantially iron-free phosphoric acid which comprises heating ferrophosphorus with 10 to 20 parts of oleum per part of ferrophosphorus, which contains between about 10 and about 25% by weight of free sulfur trioxide, at a temperature between about 100° C. and about 300° C. separating the precipitated solids from the resultant reaction mixture and heating the resultant acid mixture at a temperature between about 400° and about 500° C. to remove substantially all the excess sulfuric acid therefrom.

7. A process for producing substantially iron-free phosphoric acid which comprises heating ferrophosphorus and oleum, the latter containing about 20% by weight of free sulfur trioxide, in a ratio of about 1 part by weight of ferrophosphorus between about 10 and about 20 parts by weight of oleum, at a temperature of about 300° C. separating the precipitated solids from the resultant reaction mixture by filtration and heating the resultant solution to a temperature of about 450° C. to remove substantially all of the excess sulfuric acid contained therein.

8. A process for producing substantially iron-free phosphoric acid which comprises reacting at above about 100° C. a composition containing essentially ferrophosphorus with sulfuric acid, said sulfuric acid containing sufficient dehydrating agent having greater affinity for water than ferrous sulfate and to maintain substantially anhydrous reaction conditions, and removing excess sulfuric acid from the resultant acid mixture.

CALVIN M. TIDWELL.

REFERENCES CITED

The following references are of record in the file of this patent:

UNITED STATES PATENTS

| Number | Name | Date |
|---|---|---|
| 276,143 | Knight | Apr. 17, 1883 |
| 2,338,407 | Coleman | Jan. 4, 1944 |
| 2,415,797 | Low | Feb. 11, 1947 |

FOREIGN PATENTS

| Number | Country | Date |
|---|---|---|
| 432 | Great Britain | 1883 |
| 299 | Great Britain | 1882 |